United States Patent
Swartz et al.

(10) Patent No.: US 11,806,935 B2
(45) Date of Patent: Nov. 7, 2023

(54) METHOD OF INK REMOVAL IN AN INK-DEPENDENT 3-D PRINTING PROCESS

(71) Applicant: Impossible Objects, Inc., Northbrook, IL (US)

(72) Inventors: Robert Swartz, Highland Park, IL (US); Eugene Gore, Des Plaines, IL (US); Buckley Crist, Wilmette, IL (US); Darren Fill, Chicago, IL (US); John Bayldon, Evanston, IL (US)

(73) Assignee: Impossible Objects, Inc., Northbrook, IL (US)

( * ) Notice: Subject to any disclaimer, the term of this patent is extended or adjusted under 35 U.S.C. 154(b) by 59 days.

(21) Appl. No.: 17/324,554

(22) Filed: May 19, 2021

(65) Prior Publication Data
US 2021/0362421 A1  Nov. 25, 2021

Related U.S. Application Data

(60) Provisional application No. 63/028,015, filed on May 21, 2020.

(51) Int. Cl.
| | |
|---|---|
| *B29C 64/35* | (2017.01) |
| *B29C 64/165* | (2017.01) |
| *B33Y 40/20* | (2020.01) |
| *B33Y 10/00* | (2015.01) |

(52) U.S. Cl.
CPC ............ *B29C 64/35* (2017.08); *B29C 64/165* (2017.08); *B33Y 10/00* (2014.12); *B33Y 40/20* (2020.01)

(58) Field of Classification Search
CPC ... B29C 64/147; B29C 64/112; B29C 64/165; B29C 64/30; B29C 64/20; B29C 64/153; B29C 70/04–10; B29C 70/28–508; B32B 37/0076–0084; B32B 37/0069; B32B 5/02; B32B 7/14; B32B 5/26; B32B 5/30; B32B 9/048; B32B 5/024; B32B 9/045; B32B 27/36; B32B 29/005; B32B 9/06; B32B 27/14; B32B 29/002; B32B 5/022; B32B 29/02; B32B 27/08; B32B 27/10; B32B 5/16; B32B 29/04; B32B 27/06; B32B 9/047; B32B 18/00; B32B 27/12; B32B 5/15; B32B 9/005; G03G 15/224

See application file for complete search history.

(56) References Cited

U.S. PATENT DOCUMENTS

| | | | | |
|---|---|---|---|---|
| 4,765,942 | A * | 8/1988 | Christensen | B29C 70/44 |
| | | | | 264/331.12 |
| 6,036,900 | A * | 3/2000 | Munk | B29C 70/48 |
| | | | | 264/102 |
| 2011/0281034 | A1* | 11/2011 | Lee | B82Y 30/00 |
| | | | | 427/294 |
| 2015/0321392 | A1* | 11/2015 | Stapperfenne | B32B 27/04 |
| | | | | 264/275 |
| 2017/0151719 | A1* | 6/2017 | Swartz | B32B 5/02 |
| 2020/0148846 | A1* | 5/2020 | Furukawa | C08G 73/10 |

* cited by examiner

*Primary Examiner* — Matthew J Daniels
*Assistant Examiner* — Andrew L Swanson
(74) *Attorney, Agent, or Firm* — Dunlap Bennett & Ludwig, PLLC

(57) ABSTRACT

A method of residual ink removal in an ink-dependent 3-D printing process includes pre-heating a build block to an evaporation temperature. This is preferably done after stacking and before compression. Later compression will then involve a higher temperature to allow fusing of thermoplastic material in the build block, but without residual ink.

8 Claims, 2 Drawing Sheets

METHOD OF INK REMOVAL IN AN INK-DEPENDENT 3-D PRINTING PROCESS

RELATED APPLICATIONS

The present application claims priority to Provisional U.S. Application No. 63/028,015, filed May 21, 2020, the contents of which are hereby incorporated by reference.

FIELD OF THE INVENTION

The present invention relates to 3-D printing and more particularly to a method for removal of residual ink in an ink-dependent 3-D printing process.

Description of the Problem Solved

Applicant's previous U.S. Pat. No. 10,046,552 (incorporated herein by reference in its entirety) describes a system for the creation of 3D printed parts. This system operates according to principles that Applicant calls Composite-Based Additive Manufacturing (CBAM). In CBAM, a computer model divides a part to be printed into cross-sectional slices. Using printing technology (e.g., inkjet), a liquid is printed onto a porous sheet in a shape that corresponds to one of the cross sections of the object. The porous sheets are typically carbon fiber, but may also comprise fiberglass or other suitable substrates. Also, the printing could occur on the end of a fed roll (or web), with cutting done at a downstream stage. The printed sheet gets flooded with a powder (typically, a thermoplastic powder) such that the powder adheres to printed regions and not to unprinted regions. Various means are deployed (e.g., vibration, air knifing) to remove unadhered powder from a sheet. The sheet then moves to a stacking stage, where it is placed on top of a previous sheet (if present) that has gone through a similar process for the immediately adjacent object cross section. The stacker uses registration pins to keep the sheets aligned, fitting into holes that got punched into such sheets at the upstream printing stage. The process is repeated for as many cross sections as will be needed to create a build block of multiple substrate sheets, each stacked on top of the other in the exact order needed to represent all cross sections of the 3D object.

The build block is subjected to subsequent processing in the form of compression and heating, in order for powder on the printed areas to melt and fuse, for example as shown in prior art FIG. 1. The resulting build block after compression and heating is then subjected to abrasion to remove substrate material, e.g., the friable carbon fiber regions that never got printed and flooded with powder. The melted/fused regions resist this abrasion, and thus emerge from the process in the intended shape of the final 3D printed part defined by the computer model. Advantageously, the use of carbon fiber and thermoplastic powder in this way leads to a resulting part that is extremely durable and well suited for high tolerances needed in industrial applications—hence, it is a "composite-based" 3D printed part. The '552 patent describes various aspects of the foregoing system, and embodiments of subsystems that carry out each stage (i.e., material feeding, printing on a platen, powdering, removing powder, stacking, etc.).

Thus CBAM is a process where 3-dimensional parts are made by printing a series of ink sections of the part on flat substrate sheets, powdering the sheets so that powder adheres to the ink, stacking the sheets, compressing the sheets, fusing the powder by heat, and removing excess material by sand blasting or another method. The CBAM process is further described in the following additional patents which are hereby incorporated by reference in their entireties: U.S. Pat. Nos. 9,776,376, 9,833,949, 10,252,487, 10,377,080, 10,377,106, 10,384,437, 10,597,249 and 10,946,592.

When the CBAM process was developed, the initial builds were small; sizes of 2 inches by 2 inches were typical. Compression (as in prior art FIG. 1, reproduced from the incorporated '592 patent) was done by compressing parallel plates with a screw or other device. As the process and method was developed, larger and larger parts were made, and the process was automated. Later, hydraulic presses with heated platens and heated chambers were used, and the part size became larger with 8 inches×12 inches being typical. The '592 patent, for example, describes resistive heating. As developments in the process led to larger build blocks, the amount of anti-evaporant in the ink was increased (either ethelyne glycol, 2-pyrylodone or any other anti-evaporant known in the art). When this was done, the tensile strength of parts in some instances was reduced. Initially it was difficult to deduce what was causing this reduction. As described below the cause of this was residual ink that had not evaporated, largely because of the scale-up in size and resulting need for increased anti-evaporant.

SUMMARY OF THE INVENTION

After it was discovered that residual ink can affect the process and the final properties of the part, Applicant devised a way to minimize that effect by evaporating any residual ink prior to the melting of the adhered powder. In a typical implementation of the process, an anti-evaporant, for example 2-pyrrilidone or ethylene glycol, was with the ink which is diluted with water. Substrate sheets are printed individually.

With large build blocks, and those heated and compressed in a press with large plates, the evaporation was heretofore incomplete leaving residual fluid. This was due to the fact that it is difficult for the vapor from the boiling or vapor pressure of the ink to escape a large compressed build block. This residual fluid can lead to poor adhesion of polymer to fiber, and thus lower mechanical properties, in particular lower tensile strengths.

To address the incomplete evaporation that happens in potentially all, but particularly in large, build blocks, Applicant devised a novel processing sequence. In the new sequence, an additional set of steps is added to the overall CBAM process. Uncompressed stacked sheets are heated sufficiently to evaporate the ink. This can include sub-steps that include weighing and tracking mass loss to confirm full ink evaporation. After such evaporative heating, the stack returns to the compression and melt/fuse-heating step as normal. This has significantly improved the reliability of the CBAM process for the creation of relatively large parts.

DESCRIPTION OF THE PREFERRED EMBODIMENTS

To solve the problem of reduced tensile strength in final printed parts, a build block is printed and stacked, as is typically done in the CBAM process. The build block in its uncompressed state is put in an oven and heated to evaporate the remaining fluid, that is the fluid that has not evaporated. The ink used has been diluted with water, so in normal handling, much of the water is evaporated leaving a residue of anti-evaporant, for example 2-pyrrolidone or ethylene glycol. Approximately 150° C. produces a reasonable evaporation rate and is below the melting point of most thermoplastics that are used in the CBAM process.

Figure 1:
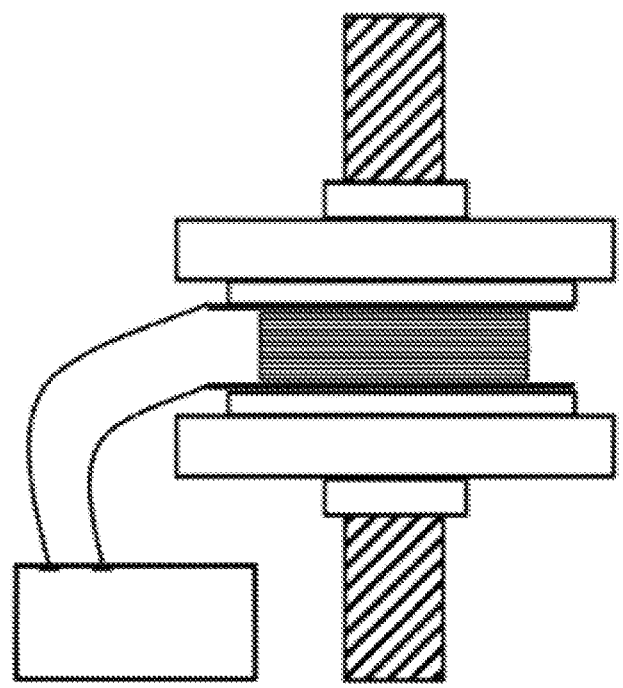
FIG. 1 (prior art) is a side view of a typical CBAM build block undergoing compression.
Figure 2:
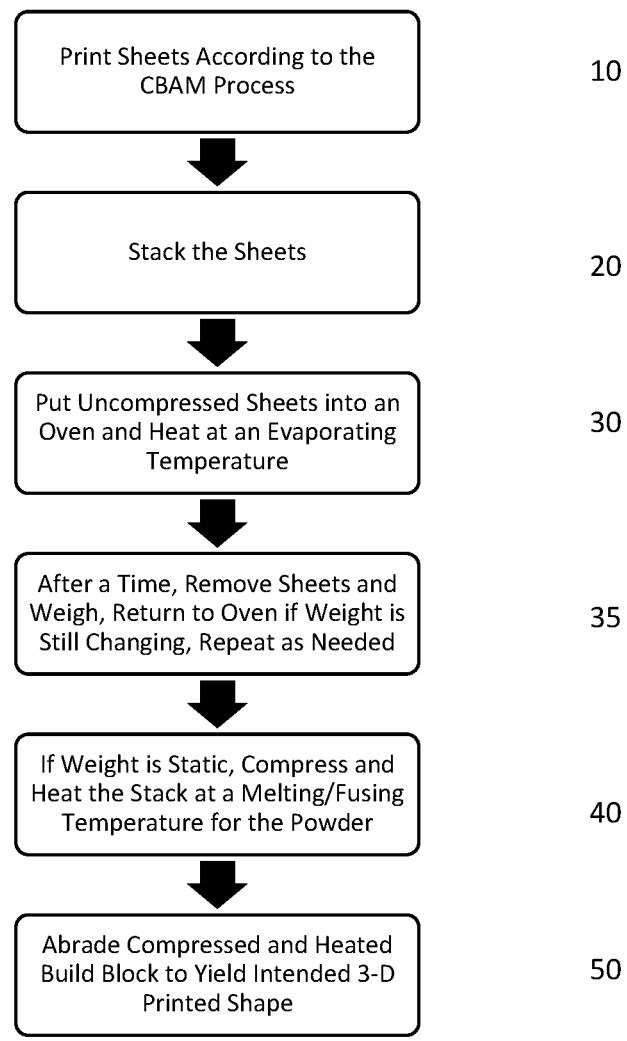
FIG. 2 is a flow diagram illustrating the process steps of the present invention to remove residual ink.

FIG. 2 is a flow diagram illustrating the process according to the invention herein. At step 10, first one prints a section pattern on a set of individual substrate sheets using the normal CBAM printing process, such as that described in the '552 patent and others incorporated by reference herein. Of course, variants of the CBAM process may be used and still advantageously allow use of the improvements described herein. At step 20, the printed section sheets are stacked into the form of an uncompressed build block. At step 30, the uncompressed build block is heated to a suitable temperature below the melting/fusing point of whatever thermoplastic powder is being used, but a relatively high temperature to allow timely liquid evaporation. Preferably, this temperature is between 140 to 180 degrees C.

The time needed to make sure all the residual ink has had time to evaporate is typically determined by the temperature, and also somewhat by the number of individual pages in the build block. To determine the length of time the build block needs to be heated, it is optionally taken out of the oven periodically and weighed, as shown at step 35. When there is no longer any mass loss, then the maximum amount of evaporation has occurred.

At step 40, the sheets are compressed and heated as is normal in the CBAM process. Finally, at step 50, abrasion (e.g., sandblasting) is used to remove the excess material, as was previously done.

In general, the temperature should be high enough to achieve a reasonable rate of evaporation, but not so high to cause the powder to begin to melt or begin to fuse. This temperature and the time required is dependent on the ink formulation, polymer used and the size of the part. 170 degrees C. is a typical preferred value for ethylene glycol ink, however other inks would use other temperatures, typically related to their boiling point.

While the above specification and examples provide a description of the invention, many embodiments of the invention can be used or made without departing from the spirit and scope of the invention. It is to be understood that the foregoing embodiments are provided as illustrative only, and do not limit or define the scope of the invention. Various other embodiments are also within the scope of the claims.

We claim:

1. A method of removing residual ink in a composite-based additive manufacturing (CBAM) process comprising:
    printing a set of substrate sheets with ink and powdering the set so that powder adheres to the printed regions;
    stacking the set of substrate sheets into an uncompressed build block;
    heating the uncompressed build block to an evaporating temperature for the ink that is below a melting or fusing temperature of the powder;
    holding the uncompressed build block at the evaporating temperature until the residual ink has evaporated;
    compressing and heating the uncompressed build block at a temperature that is at or above the melting point of the powder to result in a compressed build block; and
    removing substrate material from the compressed build block that is not combined with melted powder.

2. The method of claim 1 wherein the evaporating temperature is approximately 170 degrees C.

3. The method of claim 1 wherein the evaporating temperature is between approximately 140 degrees C. and 180 degrees C.

4. The method of claim 1 wherein the uncompressed build block is held at the evaporating temperature for a time determined by the number of sheets.

5. The method of claim 1 wherein the uncompressed build block is held at the evaporating temperature until there is no more loss of weight.

6. The method of claim 5 comprising weighing the uncompressed build block a first time for a first weighing, continuing to heat the uncompressed build block at the evaporating temperature after the first weighing, weighing the uncompressed build block a second time for a second weighing, and ending the heating at the evaporating temperature if the first and second weighings result in the same weight.

7. The method of claim 1 wherein the step of removing substrate material includes sandblasting.

8. A method of removing residual ink in a composite-based additive manufacturing (CBAM) process comprising:
    printing and placing powder on a set of substrate sheets;
    stacking the set of substrate sheets into a build block;
    heating the build block to approximately 170 degrees C.;
    holding the build block at approximately 170 degrees C. until residual ink has evaporated;
    subsequently heating the build block at a temperature that is at or above the melting point of the powder; and
    completing the CBAM process.

* * * * *